United States Patent
Lu et al.

(10) Patent No.: US 12,226,759 B2
(45) Date of Patent: Feb. 18, 2025

(54) PERYLENE IMIDE AND COMPOSITE PHOTOCATALYTIC MATERIAL THEREOF, PREPARATION METHOD THEREFOR AND APPLICATION THEREOF IN REMOVING ORGANIC POLLUTANTS FROM WATER

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 613 days.

(21) Appl. No.: 17/624,186

(22) PCT Filed: Nov. 8, 2020

(86) PCT No.: PCT/CN2020/127395
§ 371 (c)(1),
(2) Date: Dec. 30, 2021

(87) PCT Pub. No.: WO2021/120921
PCT Pub. Date: Jun. 24, 2021

(65) Prior Publication Data
US 2022/0355284 A1  Nov. 10, 2022

(30) Foreign Application Priority Data
Dec. 15, 2019 (CN) .......................... 201911287975.6

(51) Int. Cl.
B01J 31/00 (2006.01)
B01J 31/02 (2006.01)
(Continued)

(52) U.S. Cl.
CPC ........... *B01J 31/0247* (2013.01); *B01J 35/39* (2024.01); *B01J 37/08* (2013.01); *C02F 1/30* (2013.01); *C02F 2305/10* (2013.01)

(58) Field of Classification Search
None
See application file for complete search history.

(56) References Cited

FOREIGN PATENT DOCUMENTS

| CN | 105218547 A | 1/2016 |
|----|-------------|--------|
| CN | 106008971 A | 10/2016 |

(Continued)

OTHER PUBLICATIONS

WO-2011062137-A1, English translation (Year: 2011).*

(Continued)

*Primary Examiner* — Stefanie J Cohen
(74) *Attorney, Agent, or Firm* — SZDC Law PC

(57) ABSTRACT

Melamine is calcined to obtain melem; melem, perylene tetracarboxylic dianhydride and a solvent are mixed to obtain a mixture, and the mixture is subjected to a solvothermal reaction in an inert atmosphere to obtain perylene imide; and the perylene imide is dispersed in an aqueous solution containing a bismuth source and a tungsten source, and is subjected to a hydrothermal reaction to obtain a perylene imide/bismuth tungstate composite photocatalytic material. By means of constructing an organic-inorganic composite photocatalytic material, the introduction of the organic photocatalytic material that responds to visible light may enable the composite material to have a wider spectral response range; and the introduction of an inorganic semiconductor catalyst enables the composite material to produce more oxidizing active free radicals, thereby enhancing the photocatalytic degradation performance of the compos- (Continued)

ite material on organic pollutants. The constructed organic-inorganic composite photocatalytic material has an excellent catalytic performance.

3 Claims, 3 Drawing Sheets

(51) Int. Cl.
*B01J 35/39* (2024.01)
*B01J 37/08* (2006.01)
*C02F 1/30* (2023.01)

(56) References Cited

FOREIGN PATENT DOCUMENTS

| | | | | |
|---|---|---|---|---|
| CN | 108579806 A | 9/2018 | | |
| CN | 111001439 A | 4/2020 | | |
| DE | 102012007529 A1 * | 10/2013 | ........... | C07D 487/16 |
| WO | WO-2011062137 A1 * | 5/2011 | ........... | C08G 18/345 |

OTHER PUBLICATIONS

DE-102012007529-A1, English translation (Year: 2013).*
Zhang et al, Self-assembled perylene diimide based supramolecular heterojunction with Bi2WO6 for efficient visible-light-driven photocatalysis, applied catalysis B: Enviromental, vol. 232, pp. 175-181 (Year: 2018).*
K Zhang et al., "Self-assembled perylene diimide based supramolecular heterojunction with Bi2WO6 for efficient visible-light-driven photocatalysis" Applied Catalysis B: Environmental 232 (2018) 175-181 (Mar. 19, 2018).

* cited by examiner

PERYLENE IMIDE AND COMPOSITE PHOTOCATALYTIC MATERIAL THEREOF, PREPARATION METHOD THEREFOR AND APPLICATION THEREOF IN REMOVING ORGANIC POLLUTANTS FROM WATER

This application is the National Stage Application of PCT/CN2020/127395, filed on Nov. 8, 2020, which claims priority to Chinese Patent Application No. 201911287975.6, filed on Dec. 15, 2019, which is incorporated by reference for all purposes as if fully set forth herein.

FIELD OF THE INVENTION

The invention belongs to the field of organic-inorganic nanocomposites and also relates to the field of photocatalytic oxidation, in particular to a perylene imide/bismuth tungstate organic-inorganic composite photocatalytic material based on perylene imide, a preparation method thereof and its application in photocatalytic removal of organic pollutants in water.

BACKGROUND OF THE INVENTION

With the development of industrial production, human beings directly or indirectly discharge harmful substances exceeding its self purification ability to the environment, which has seriously deteriorated our living environment. Environmental pollution has become a more and more urgent problem to be solved. As a new clean technology, photocatalysis provides new ideas and ways for environmental treatment. Photocatalysis technology can convert low-density solar energy into high-density electrical and chemical energy. At the same time, photocatalysts can produce a variety of active free radicals under light conditions to degrade various organic pollutants in water and make them photooxidized into non-toxic substances. It is widely used in organic degradation. Photocatalytic technology can make full use of sunlight at room temperature. It has the advantages of low cost and no pollution. It has a wide application prospect in the treatment of organic pollutants in water.

At present, photocatalytic materials are mainly divided into inorganic semiconductors and organic photocatalytic materials. Although inorganic semiconductor photocatalysts have the characteristics of good catalytic activity and wide applicable environment, most of them are metal semiconductor materials. These semiconductor materials will not only increase the economic cost due to mass production, but also aggravate the metal ion pollution. In comparison, organic photocatalytic materials will become a better choice because of their high chemical stability and rich reserves.

SUMMARY OF THE INVENTION

The object of the invention is to provide a composite photocatalytic material (PI@BWO) with two-dimensional bismuth tungstate nano sheet (BWO) supported on the surface of perylene imide (PI) organic compound and a preparation method thereof, to construct visible light responsive composite photocatalytic materials, and realize the effective removal of organic pollutants in water through photocatalytic reaction. The invention constructs an organic-inorganic composite photocatalytic material. On the one hand, the introduction of the visible light responsive organic photocatalytic material can make the composite photocatalytic material have a wider spectral response range; on the other hand, the introduction of inorganic semiconductor catalyst enables the composites to produce more oxidizing active radicals and enhance the photocatalytic degradation performance of the composites to organic pollutants. Therefore, the constructed organic-inorganic composite photocatalytic materials have excellent catalytic performance.

In order to achieve the above object, the specific technical scheme of the invention is as following:

A perylene imide, the preparation method of which comprising the following steps: calcining melamine to obtain melem; thereafter, mixing the melem, perylene tetracarboxylic dianhydride and a solvent to obtain a mixture, and then placing the mixture in an inert atmosphere to obtain perylene imide by solvothermal reaction.

A perylene imide/bismuth tungstate composite photocatalytic material, the preparation method of which comprising the following steps:
1) calcining melamine to obtain melem; thereafter, mixing the melem, perylene tetracarboxylic dianhydride and a solvent to obtain a mixture, and then placing the mixture in an inert atmosphere to obtain perylene imide by solvothermal reaction;
2) dispersing the perylene imide obtained in step 1) in an aqueous solution containing bismuth source and tungsten source to obtain the perylene imide/bismuth tungstate composite photocatalytic material by hydrothermal reaction.

A method to remove the organic pollutant in water, comprising the following steps:
1) calcining melamine to obtain melem; thereafter, mixing the melem, perylene tetracarboxylic dianhydride and a solvent to obtain a mixture, and then placing the mixture in an inert atmosphere to obtain perylene imide by solvothermal reaction;
2) dispersing the perylene imide obtained in step 1) in an aqueous solution containing bismuth source and tungsten source to obtain the perylene imide/bismuth tungstate composite photocatalytic material by hydrothermal reaction;
3) adding the perylene imide/bismuth tungstate composite photocatalytic material in water containing organic pollutants, and treating by light to remove organic pollutants in water.

The present invention discloses the application of the perylene imide/bismuth tungstate composite photocatalytic material in removal of organic pollution in water; or the application of the perylene imide in preparing a composite photocatalytic material for removing organic pollutants from water.

In the invention, melem is obtained by calcining melamine at high temperature. The calcination is carried out in air. Preferably, it is calcined at 400-450° C. for 3-5 h. Further preferably, the heating rate during calcination is 4-8° C./min.

In the invention, the solvothermal reaction is in an inert gas and reacts at 180-200° C. for 72-120 h, preferably, said inert gas is argon.

In the invention, the solvent is a mixture of DMF and ethylene glycol, preferably, the molar ratio of melem to perylene tetracarboxylic dianhydride is 2:3, and the volume ratio of DMF to ethylene glycol is 1.

In the invention, centrimethyl ammonium bromide (CTAB) is used as the template in the hydrothermal reaction. After the hydrothermal reaction, bismuth tungstate nano sheets are grown on the surface of perylene imide to obtain perylene imide/bismuth tungstate composite photocatalytic material (PI@BWO), that is the perylene imide/bismuth tungstate composite photocatalytic material; and the hydrothermal reaction is carried out at 120-180° C. for 12-24 h.

In the invention, the bismuth source is bismuth nitrate pentahydrate, the tungsten source is sodium tungstate dihydrate, and the molar ratio of bismuth source to tungsten source is 2:1; Preferably, the mass ratio of bismuth nitrate pentahydrate, sodium tungstate dihydrate and perylene imide is 97:33: (25-35), preferably 97:33:30.

In the invention, melamine is weighed and placed in a porcelain crucible with a cover; then, cover it, place it in muffle furnace, set the heating rate at 4-8° C./min, calcine it at 400-450° C. in air atmosphere for 3-5 h, after cooling to room temperature, centrifuge the product and wash it with absolute ethanol, and then dry it in vacuum drying oven to obtain melem; then, the perylene imide (PI) is synthesized by solvothermal method. Firstly, melem, perylene tetracarboxylic anhydride, DMF and ethylene glycol are added into the grinding reaction bottle and dispersed under ultrasound for 1-2 h; then, argon is introduced for protection, and it is placed in a blast drying oven at 180-200° C. for 72-120 h. After the reaction, cool to room temperature, the dark red product is filtered using 0.22-0.45 μm organic phase microporous filter membrane to obtain filter cake, wash the filter cake with DMF, acetone and absolute ethanol respectively, and then dry it in vacuum drying oven for 12-24 hours to obtain perylene imide.

In the invention, bismuth source and tungsten source are used as precursors, centrimethyl ammonium bromide (CTAB) is used as the template agent, which is respectively taken into the beaker, dissolved with deionized water, stirred at room temperature for 0.5-1 h, then added with the above perylene imide, stirred for 0.5-1 h to obtain a uniformly dispersed suspension, then dispersed by ultrasonic for 1-2 h, and then transferred to a 50 mL polytetrafluoroethylene lined high-pressure reactor for reaction in a blast drying oven at 120-180° C. for 12-24 h; after the reaction, stop heating and wait the reactor to cool to room temperature, the product is centrifuged and washed with deionized water to obtain perylene imide/bismuth tungstate composite photocatalytic material (PI@BWO).

In the invention, the organic pollutants in the water body are phenolic pollutants; The illumination processing is visible light processing or simulated visible light processing.

Advantages of the Invention

1. The perylene imide disclosed by the invention is an organic photocatalytic material, which has the advantages of stable skeleton, rich source of raw materials, low cost, diversified synthesis and modification methods, etc.
2. Perylene imide/bismuth tungstate composite photocatalytic material disclosed by the invention (PI@BWO) has a large specific surface area and provides a large number of active sites, so as to promote its adsorption of organic pollutants in water and surface catalytic reaction, and improve photocatalytic efficiency.
3. The perylene imide/bismuth tungstate composite photocatalytic material disclosed by the invention (PI@BWO) has a wide range of light response and is a good visible light photocatalytic composite.

DETAILED DESCRIPTION OF THE INVENTION

In the invention, the preparation method of the perylene imide comprising the following steps: calcining melamine to obtain melem; thereafter, mixing the melem, perylene tetracarboxylic dianhydride and a solvent to obtain a mixture, and then placing the mixture in an inert atmosphere to obtain perylene imide by solvothermal reaction.

The preparation method of the perylene imide/bismuth tungstate composite photocatalytic material comprising the following steps:

1) calcining melamine to obtain melem; thereafter, mixing the melem, perylene tetracarboxylic dianhydride and a solvent to obtain a mixture, and then placing the mixture in an inert atmosphere to obtain perylene imide by solvothermal reaction;

2) dispersing the perylene imide obtained in step 1) in an aqueous solution containing bismuth source and tungsten source to obtain the perylene imide/bismuth tungstate composite photocatalytic material by hydrothermal reaction.

Embodiment 1

Figure 1:
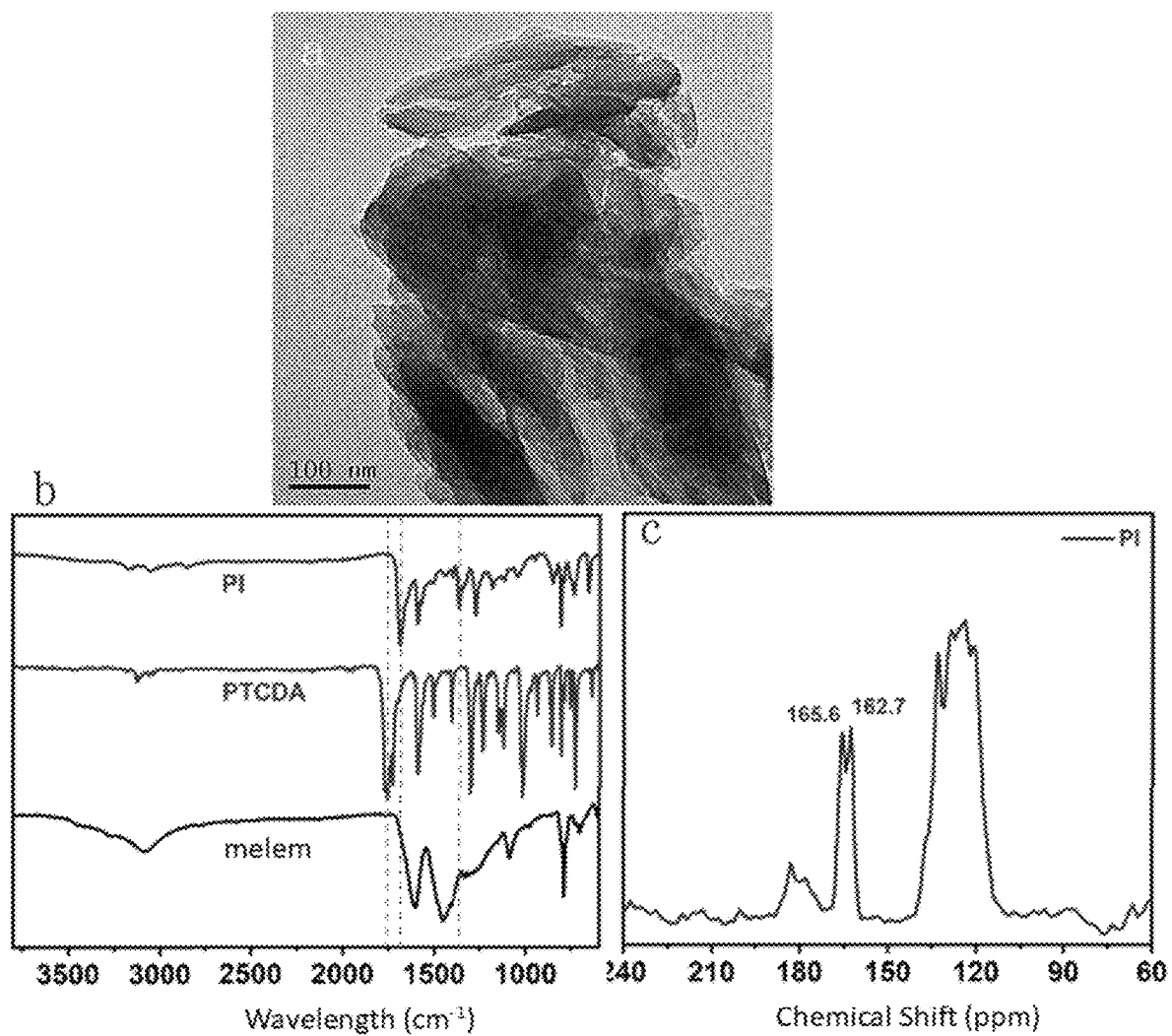
FIG. 1 is a transmission electron microscope photograph (a), an infrared spectrum (b) and a nuclear magnetic spectrum (c) of perylene imide (PI) of embodiment 1.

The invention first adopts the method of high-temperature calcination to synthesize melem. First, weigh 5 g of melamine and place it in a 25 ml porcelain crucible with a cover; then, cover it and place it in muffle furnace, and set the heating rate to 5° C./min (room temperature rises to 425° C.), calcine at 425° C. for 4 h in air atmosphere, after cooling to room temperature, centrifuge the light yellow product and wash it with absolute ethanol for 3 times, and then dry it in a 60° C. vacuum drying oven for 12 h to obtain melem. Then, perylene imide is synthesized by solvothermal method. First, 88.1 mg of melem and 235.8 mg of perylene tetracarboxylic dianhydride are weighed and add in a 10 mL milled reaction bottle, then add 10 mL mixed solvent of DMF/EG (volume ratio: 1:1) and disperse it by ultrasonic for 1 h; then, inject argon for protection, check the air tightness, and put it in a 200° C. blast drying oven for 120 h. After the reaction, cool to room temperature, the dark red product is filtered with 0.45 μm organic phase microporous membrane to obtain a filter cake which is washed with DMF, acetone and absolute ethanol for 3 times respectively, and then dried in a 60° C. vacuum drying oven for 24 hours to obtain perylene imide. The transmission electron microscope diagram is shown in FIG. 1a, and the infrared and nuclear magnetic spectra are tested. The infrared spectrum shows that imide cyclocarbonyl at 1687.6 $cm^{-1}$ and the appearance of C—N stretching vibration characteristic peak at 1363.6 $cm^{-1}$ can prove the successful synthesis of perylene imide. In addition, the solid $^{13}C$ nuclear magnetic spectrum shows that 180.2 ppm corresponds to imide ring C=O, 165.6 and 162.7 ppm correspond to C—$N_3$ and C=N of heptane structure respectively, and 110~140 ppm correspond to Ar—C in perylene structure, which can further prove the structure of perylene imide.

Embodiment 2

Preparation of perylene imide/bismuth tungstate composite photocatalytic material (PI@BWO), the specific steps are as follows:

The invention uses centrimethyl ammonium bromide (CTAB) as a template to grow bismuth tungstate nano sheets on the surface of perylene imide by hydrothermal method, so as to obtain perylene imide/bismuth tungstate composite photocatalytic material (PI@BWO). First, weigh 48.5 mg of bismuth nitrate pentahydrate and 16.5 mg of sodium tungstate dihydrate, add 35 ml of deionized water dissolved with 5 mg of centrimethyl ammonium bromide, magnetic stirring and dispersion for 30 min; then, weigh 30 mg perylene imide (preparation of embodiment 1) in the above mixed solution, continue stirring for 30 min to obtain uniformly dispersed dark red suspension, and then ultrasonic dispersion for 1 h; finally, transfer the mixed solution to a 50 mL polytetrafluoroethylene lined high-pressure reactor and react in a 120° C. blast drying oven for 24 h. After the reaction, stop heating, and feed the product after the reactor is naturally cooled to room temperature. Perylene imide/bismuth tungstate nanocomposite photocatalyst is obtained by centrifugation and washing with deionized water for 3 times (PI@BWO), dry in a 60° C. blast oven for 24 hours. The loading amount of bismuth tungstate nanosheets in the composite photocatalytic material obtained in this embodiment is too small, and bismuth tungstate nanosheets grow only locally on the surface of perylene imide organic compound.

Embodiment 3

Figure 2:
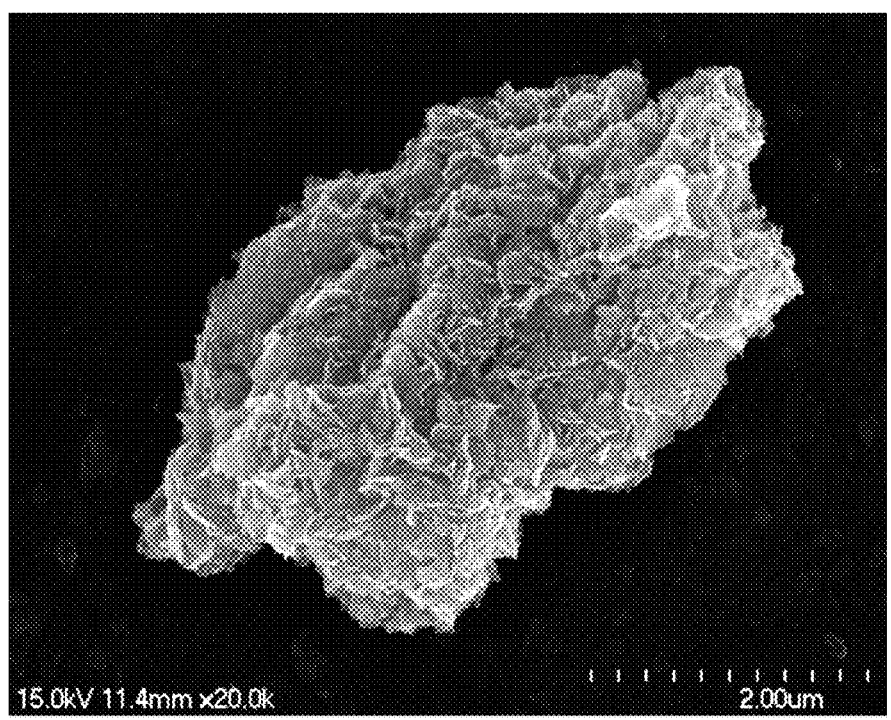
FIG. 2 shows a SEM photo of the perylene imide/bismuth tungstate composite photocatalytic material of embodiment 3 (PI@BWO)
Figure 3:
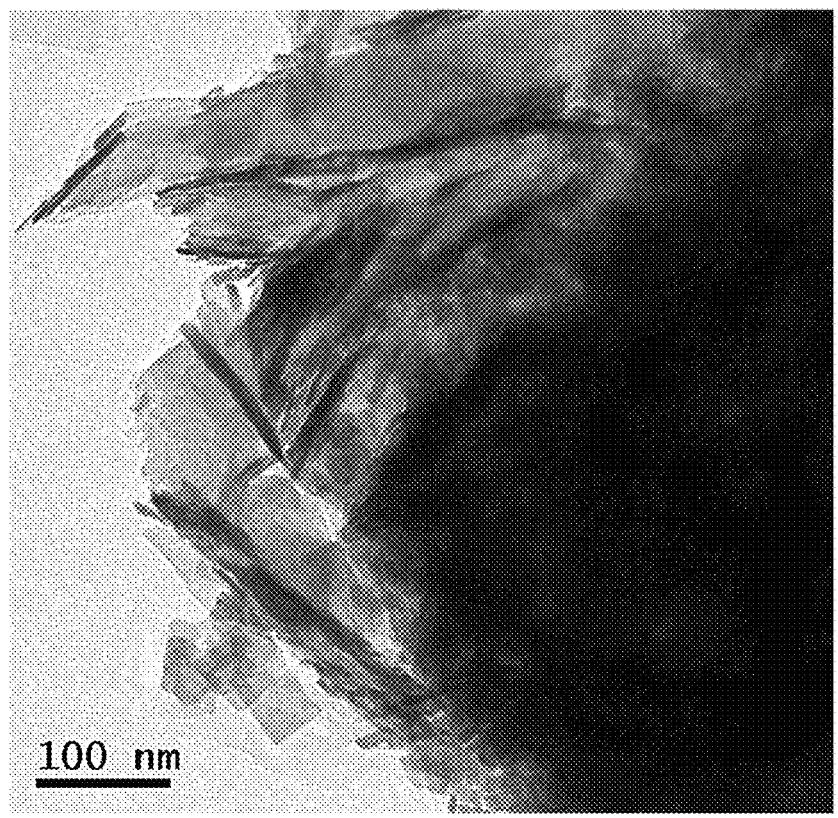
FIG. 3 shows the TEM photo of perylene imide/bismuth tungstate composite photocatalytic material of embodiment 3 (PI@BWO)
Figure 4:
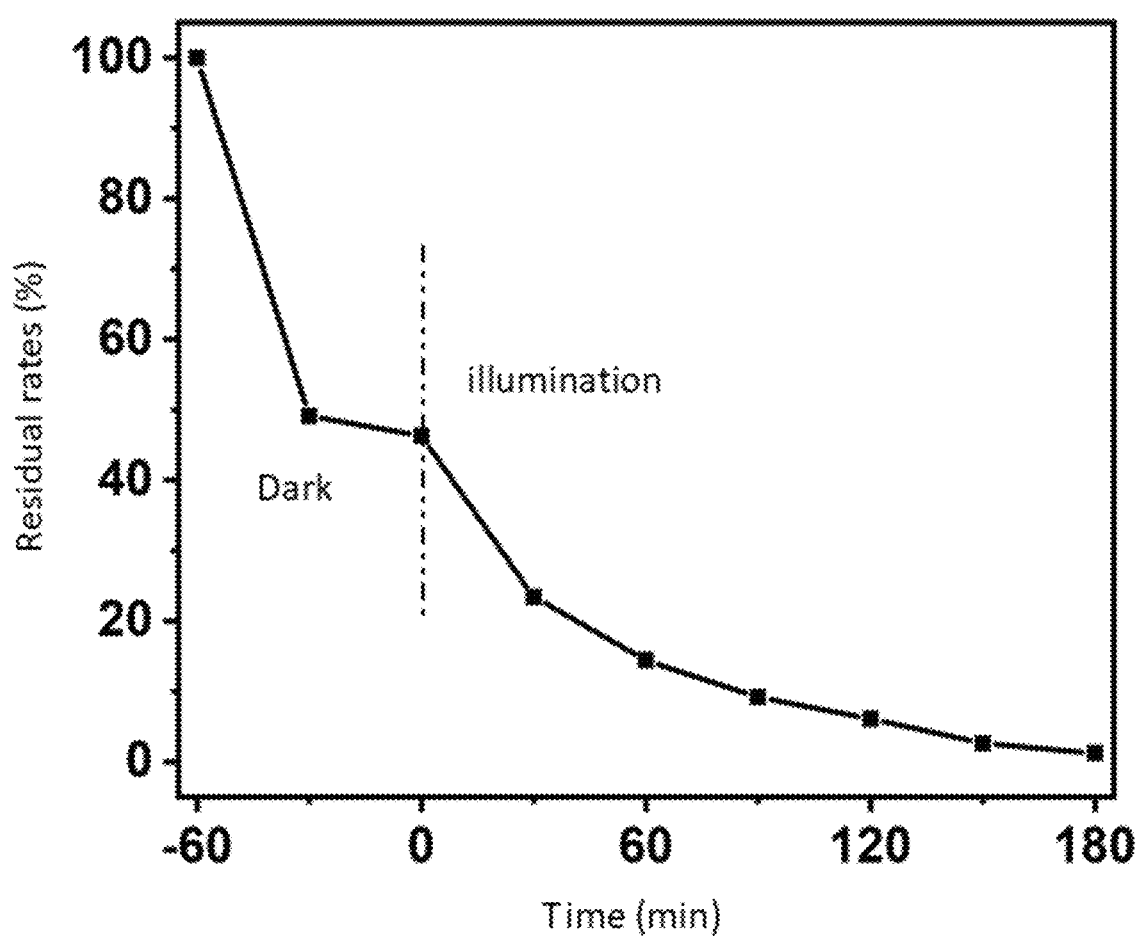
FIG. 4 shows the effect diagram of the perylene imide/bismuth tungstate composite photocatalytic material of embodiment 3 (PI@BWO) of degradation of bisphenol A in water.

First, weigh 97.0 mg of bismuth nitrate pentahydrate and 33.0 mg of sodium tungstate dihydrate, add 35 ml of deionized water dissolved with 10 mg of centrimethyl ammonium bromide, magnetic stirring and dispersion for 30 min; Then, weigh 30 mg perylene imide in the above mixed solution, continue stirring for 30 min to obtain a uniformly dispersed dark red suspension, and then ultrasonic dispersion for 1 h; Finally, the mixed solution is transferred to a 50 ml polytetrafluoroethylene lined high-pressure reactor and reacted in a 120° C. blast drying oven for 24 hours. After the reaction, the heating is stopped. After the reactor is naturally cooled to room temperature, the product is centrifuged and washed with deionized water for 3 times to obtain perylene imide/bismuth tungstate composite photocatalytic material (PI@BWO), dry in a 60° C. blast oven for 24 hours. FIG. 2 shows SEM photo of perylene imide/bismuth tungstate composite photocatalytic material (PI@BWO); FIG. 3 is a transmission electron microscope photograph. It can be seen from the figure that bismuth tungstate nanosheets in the composite photocatalytic material obtained in this embodiment are uniformly loaded on the surface of perylene imide.

Embodiment 4

First, weigh 145.5 mg of bismuth nitrate pentahydrate and 49.5 mg of sodium tungstate dihydrate, add 35 ml of deionized water dissolved with 15 mg of centrimethyl ammonium bromide, magnetic stirring and dispersion for 30 min; Then, weigh 30 mg perylene imide in the above mixed solution, continue stirring for 30 min to obtain a uniformly dispersed dark red suspension, and then ultrasonic dispersion for 1 h; Finally, the mixed solution is transferred to a 50 ml polytetrafluoroethylene lined high-pressure reactor and reacted in a 120° C. blast drying oven for 24 hours. After the reaction, the heating is stopped. After the reactor is naturally cooled to room temperature, the product is centrifuged and washed with deionized water for 3 times to obtain perylene imide/bismuth tungstate composite photocatalytic material (PI@BWO), dry in a 60° C. blast oven for 24 hours. In the composite photocatalytic material obtained in this embodiment, bismuth tungstate nanosheets are agglomerated, and there are few bismuth tungstate nanosheets uniformly loaded on the surface of perylene imide.

Embodiment 5

Photocatalytic degradation experiment of perylene imide/bismuth tungstate composite photocatalytic material (PI@BWO) of bisphenol A in water: weigh 25 mg of perylene imide/bismuth tungstate composite photocatalytic material obtained in embodiment 3 or embodiment 4 and embodiment 5 above (PI@BWO), put it into 50 ml bisphenol A aqueous solution with a concentration of 10 mg/L and stir it for 1 h without light to achieve adsorption desorption equilibrium. After equilibrium, the prepared photocatalytic material is irradiated with a 300 W xenon lamp cold light source, and the degradation experiment is started. 1 mL is sampled every 30 min, the signal intensity of the water sample at the wavelength of 280 nm is measured by high performance liquid chromatography with an ultraviolet detector, and the concentration of bisphenol A in the corresponding water sample is calculated. Referring to the standard curve, the residual concentration of bisphenol A in the corresponding water sample is obtained. FIG. 3 shows the relationship between the concentration and time of residual bisphenol A obtained by photocatalytic degradation of bisphenol A in water using the perylene imide/bismuth tungstate composite photocatalytic material obtained by embodiment 3 (PI@BWO). It can be seen from the figure that while adding PI@BWO photocatalytic material and under the condition of illumination, the removal rate of bisphenol A in aqueous solution reached more than 99% after 180 minutes of illumination. Compared with the effect of the perylene imide/bismuth tungstate composite photocatalytic material (PI@BWO) obtained in embodiment 2 and embodiment 4, the photocatalytic effect of the composite photocatalytic material obtained in embodiment 3 is the best. Table 1 shows the removal rate of bisphenol A in aqueous solution after 180 minutes of illumination with the same experimental method above for different catalysts.

TABLE 1

| Removal rate of bisphenol A by different catalysts | |
|---|---|
| | Removal Rate |
| embodiment 3 | 99.7% |
| embodiment 2 | 96.1% |
| embodiment 4 | 86.0% |
| embodiment 1 | 77.6% |
| BWO | 77.8% |

BWO is prepared by weighing 97.0 mg bismuth nitrate pentahydrate and 33.0 mg sodium tungstate dihydrate, adding 35 ml deionized water with 10 mg centrimethyl ammonium bromide, magnetic stirring and dispersion for 30 min, and then ultrasonic dispersion for 1 h; Finally, the mixed solution is transferred to a 50 ml polytetrafluoroethylene lined high-pressure reactor and reacted in a 120° C. blast drying oven for 24 hours. After the reaction, stop heating. After the reactor is naturally cooled to room temperature, the product is centrifuged and washed with deionized water for 3 times to obtain bismuth tungstate photocatalytic material (BWO), which is dried in a 60° C. blast oven for 24 hours.

The invention discloses an organic-inorganic composite photocatalytic material with visible light response based on perylene imide organic compound. First, perylene imide is prepared by solvothermal method (PI); then, the precursor of bismuth tungstate is evenly distributed on the surface of perylene imide by ultrasonic dispersion; further, bismuth tungstate nano sheets are grown on the surface of perylene imide by hydrothermal method to obtain a new organic-inorganic composite photocatalytic material. When using this material for catalytic reaction, the combination of organic photocatalytic material and inorganic two-dimensional nano sheets can not only accelerate electron hole separation and improve photocatalytic efficiency, moreover, the introduction of nano sheets can also provide large specific surface area and rich active sites to promote the adsorption and surface catalysis of organic pollutants by composite photocatalysts.

In conclusion, the invention constructs an organic-inorganic hybrid photocatalytic material composed of perylene imide organic compound with visible light response and two-dimensional bismuth tungstate nano sheet. This design is not only conducive to the separation and migration of photogenerated electron hole pairs, but also improves the adsorption capacity of small molecules of organic pollutants, at the same time, provides a large number of surface catalytic active sites. In terms of catalytic performance, the above prepared perylene imide/bismuth tungstate organic-inorganic nanocomposite photocatalytic material (PI@BWO) shows effective degradation of bisphenol A in water.

What we claim is:

1. A method of preparing a perylene imide comprising the following steps:
   calcining melamine to obtain a melem;
   mixing the melem, perylene tetracarboxylic dianhydride and a solvent to obtain a mixture, and placing the mixture in an inert atmosphere to obtain perylene imide by a solvothermal reaction,
   wherein the calcination is carried out in air and calcined at 400~450° C. for 3-5 h, and the solvothermal reaction is carried out in inert gas at 180-200° C. for 72-120 h; and
   wherein the solvent is a mixture of DMF and ethylene glycol, and a molar ratio of the melem to the perylene tetracarboxylic dianhydride is 2:3.

2. A method of preparing a perylene imide/bismuth tungstate composite photocatalytic material comprising the following steps:
   1) calcining melamine to obtain a melem; thereafter, mixing the melem, perylene tetracarboxylic dianhydride and a solvent to obtain a mixture, and then placing the mixture in an inert atmosphere to obtain perylene imide by solvothermal reaction;
   2) dispersing the perylene imide obtained in step 1) in an aqueous solution containing bismuth source and tungsten source to obtain the perylene imide/bismuth tungstate composite photocatalytic material by hydrothermal reaction,
   wherein the calcination is carried out in air and calcined at 400-450° C. for 3-5 h, and the solvothermal reaction is carried out in inert gas at 180-200° C. for 72-120 h;
   wherein the solvent is a mixture of DMF and ethylene glycol, and a molar ratio of the melem to the perylene tetracarboxylic dianhydride is 2:3;
   wherein centrimethyl ammonium bromide is used as a template in the hydrothermal reaction, and the hydrothermal reaction is carried out at 120-180° C. for 12-24 h; and
   wherein the bismuth source is bismuth nitrate pentahydrate, the tungsten source is sodium tungstate dihydrate, and a molar ratio of bismuth source to tungsten source is 2:1.

3. The method according to claim 2, further comprising photodegrading organic pollution in water for the removal of the organic pollution in the water with the perylene imide/bismuth tungstate composite photocatalytic material of claim 2.

* * * * *